United States Patent
Pearson et al.

(10) Patent No.: US 8,792,351 B1
(45) Date of Patent: Jul. 29, 2014

(54) METHOD AND SYSTEM FOR NETWORK COMMUNICATION

(75) Inventors: Daniel R. Pearson, Rocklin, CA (US); Charles Micalizzi, Jr., Capistrano Beach, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 416 days.

(21) Appl. No.: 13/330,085

(22) Filed: Dec. 19, 2011

Related U.S. Application Data

(63) Continuation of application No. 11/762,578, filed on Jun. 13, 2007, now Pat. No. 8,102,769.

(51) Int. Cl.
*H04L 12/28* (2006.01)

(52) U.S. Cl.
USPC ........................................... 370/235

(58) Field of Classification Search
USPC ......... 370/231, 235, 393, 412–418, 455, 463, 370/465–466
See application file for complete search history.

(56) References Cited

U.S. PATENT DOCUMENTS

| | | | |
|---|---|---|---|
| 5,982,778 A | 11/1999 | Mangin et al. | |
| 6,122,289 A | 9/2000 | Brown et al. | |
| 6,141,327 A | 10/2000 | Kalkunte et al. | |
| 6,564,267 B1 | 5/2003 | Lindsay | |
| 7,231,455 B2 | 6/2007 | Marejka et al. | |
| 7,409,485 B1 | 8/2008 | Sartin | |
| 8,589,587 B1 * | 11/2013 | Michailidis et al. | 709/237 |
| 2002/0136217 A1 | 9/2002 | Christensen | |
| 2004/0095883 A1 | 5/2004 | Chu et al. | |
| 2005/0132099 A1 | 6/2005 | Honma | |
| 2005/0267967 A1 | 12/2005 | Markos et al. | |
| 2006/0215691 A1 | 9/2006 | Kobayashi et al. | |
| 2007/0133414 A1 | 6/2007 | Krishna et al. | |
| 2007/0230344 A1 | 10/2007 | Hua et al. | |

OTHER PUBLICATIONS

"Office Action from USPTO dated Aug. 28, 2009 for U.S. Appl. No. 11/762,578".
"Final Office Action from USPTO dated Apr. 26, 2010 for U.S. Appl. No. 11/762,578".
"Office Action from USPTO dated Sep. 17, 2010 for U.S. Appl. No. 11/762,578".
"Office Action from USPTO dated Jan. 12, 2011 for U.S. Appl. No. 11/762,578".
"Office Action from USPTO dated Jun. 17, 2011 for U.S. Appl. No. 11/762,578".
"Notice of Allowance from USPTO dated Dec. 12, 2011 for U.S. Appl. No. 11/762,578".

* cited by examiner

*Primary Examiner* — Kwang B Yao
*Assistant Examiner* — Syed M Bokhari
(74) *Attorney, Agent, or Firm* — Klein, O'Neill & Singh, LLP

(57) ABSTRACT

A method and system for network communication is provided. The method for network communication comprises setting a data size for a network connection, wherein the data size represents an amount of network data a network adapter can send to a host system for the network connection before the network adapter waits for an application to accept any data that has been sent to the host system; monitoring the amount of network data that is received by a host system driver; monitoring the amount of network data that is sent by the network adapter; and suspending transfer of network data to the host system, if the amount of network data sent by the network adapter is similar to the set data size.

8 Claims, 11 Drawing Sheets

METHOD AND SYSTEM FOR NETWORK COMMUNICATION

CROSS-REFERENCE TO RELATED APPLICATIONS

This application is a continuation of application Ser. No. 11/762,578, filed on Jun. 13, 2007, now U.S. Pat. No. 8,102,769, the entire contents of which are hereby incorporated by reference.

1. FIELD OF THE INVENTION

The present invention relates to network systems, and more particularly, to offloading host system tasks for managing network related operations.

2. BACKGROUND OF THE INVENTION

Computer networks are commonly used in various applications. Computing systems typically use a network adapter to communicate with other networked devices. Continuous efforts are being made to efficiently improve processing of network data.

SUMMARY

In one embodiment, a method for network communication is provided. The method comprises setting a data size for a network connection, wherein the data size represents an amount of network data a network adapter can send to a host system for the network connection before the network adapter waits for an application to accept any data that has been sent to the host system; monitoring the amount of network data that is received by a host system driver; monitoring the amount of network data that is sent by the network adapter; and suspending transfer of network data to the host system, if the amount of network data sent by the network adapter is similar to the set data size.

In another embodiment, a method for network communication is provided. The method comprises setting a data size for a network connection, wherein the data size represents an amount of network data a network adapter can send to a host system for the network connection before the network adapter waits for an application to accept any data that has been sent to the host system; monitoring an amount of network data that is received by a host system driver; wherein a value for a first counter for a host system memory indicates the amount of network data received by the host system driver; monitoring an amount of network data that is sent by the network adapter; wherein a value for a second counter for a network adapter memory indicates the amount of data that is sent to the host system; and suspending transfer of network data to the host system, if the amount of network data sent by the network adapter is similar to the set data size.

In yet another embodiment, a system for network communication is provided. The system comprises a host system executing an application for communicating with at least one networked device; and a network adapter interfacing with the host system and receiving network data from the at least one network device; wherein a data size is set for a network connection and the data size represents an amount of network data the network adapter can send to the host system for the network connection before the network adapter waits for the application to accept any data that has been sent to the host system; and the network adapter suspends transfer of network data to the host system, if the amount of network data sent by the network adapter is similar to the set data size after monitoring the amount of network data that is received by a host system driver and monitoring the amount of network data that is sent by the network adapter.

This brief summary has been provided so that the nature of the invention may be understood quickly. A more complete understanding of the invention can be obtained by reference to the following detailed description of the various embodiments thereof concerning the attached drawings.

BRIEF DESCRIPTION OF THE DRAWINGS

The foregoing features and other features of the present invention will now be described with reference to the drawings of various embodiments. In the drawings, the same components have the same reference numerals. The illustrated embodiments are intended to illustrate, but not to limit the invention. The drawings include the following figures.

DETAILED DESCRIPTION

To facilitate the understanding of the various embodiments, a top-level description of common network protocols/standards and the general architecture/operation of a host system will be described. The specific architecture and operation of the various embodiments will then be described with reference to the general architecture.

Computing systems and devices use various protocols/standards for network communication. Computer networks typically use a layered protocol structure to manage network traffic. One common model that is typically used is an ISO model that includes a physical layer, a data link layer that includes a MAC layer, a network layer and other layers also. Upper level protocol layers (ULPs) (for example, iSCSI and RDMA) described below, interface with a network layer to send and receive data from the network.

Figure 1A:
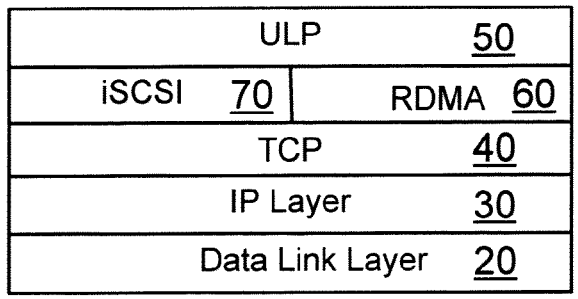
FIG. 1A shows an example of various protocol layers in a networking system.

FIG. 1A shows an example of various protocol layers (10) that may be used in networking systems. Data link layer (which includes a MAC layer) 20 interfaces with an IP (Internet Protocol) layer 30. TCP (Transmission Control Protocol) layer typically sits on top of the IP layer 30. Upper Layer Protocols (ULPs) 50 may include plural layers, for example, iSCSI layer 70, RDMA layer 60 and others. The following provides a brief introduction to some of these standards/protocols:

Transmission Control Protocol/Internet Protocol ("TCP/IP"): TCP (40) is a standard network protocol (incorporated herein by reference in its entirety) that provides connection-oriented, reliable, byte stream service. This means that two nodes establish a logical connection before sending data and TCP maintains state information regarding the data transfer. Reliable means that data is delivered in the same order that it was sent. A byte stream service means that TCP views data to be sent, as a continuous data stream that is sent in any way it sees fit and delivers it to a remote node as a byte stream.

IP (30) is a standard protocol (incorporated herein by reference in its entirety) that provides a datagram service whose function is to enable routing of data through various network subnets. Each of these subnets could be a different physical link such as Ethernet, ATM, or others. IP layer 30 is responsible for fragmentation of transmit data to match a local link's maximum transmission unit (MTU). IP layer 30 fragments data at a source node or at any intervening router between a source and a destination node.

iSCSI Protocol: Internet SCSI (iSCSI) protocol as defined by the Internet Engineering Task Force (IETF) maps the standard SCSI protocol on top of the TCP/IP protocol. iSCSI (incorporated herein by reference in its entirety) is based on the Small Computer Systems Interface ("SCSI") standard, which enables host computer systems to perform block level input/output ("I/O") operations with a variety of peripheral devices including disk and tape devices, optical storage devices, as well as printers and scanners. The iSCSI and TCP/IP protocol suite consist of four protocol layers: the application layer (of which iSCSI is one layer); the transport layer (TCP), the network layer (IP) and the link layer (i.e. Ethernet).

A traditional SCSI connection between a host system and peripheral device is through parallel cabling and is limited by distance and device support constraints. For storage applications, iSCSI was developed to take advantage of network architectures based on Ethernet standards.

The iSCSI architecture is based on a client/server model. Typically, the client is a host system such as a file server that issues a read or write command. The server may be a disk array that responds to the client's request. Typically, the client is an initiator that initiates a read or write command and a disk array is a target that accepts a read or write command and performs the requested operation.

In a typical iSCSI exchange, an initiator sends a "read" or "write" command to a target. For a read operation, the target sends the requested data to the initiator. For a write command, the target sends a "Ready to Transfer Protocol Data Unit ("PDU")" informing the initiator that the target is ready to accept the write data. The initiator then sends the write data to the target.

Once the data is transferred, the exchange enters the response phase. The target then sends a response PDU to the initiator with the status of the operation. Once the initiator receives this response, the exchange is complete. The use of TCP guarantees the delivery of the PDUs.

Typically, logical units in a target process commands. Commands are sent by a host system in Command Descriptor Blocks ("CDB"). A CDB is sent to a specific logical unit and may include a command to read a specific number of data blocks. The target's logical unit transfers the requested data block to the initiator, terminating with a status message, indicating completion of the request. iSCSI encapsulates CDB transactions between initiators and targets over TCP/IP networks.

As iSCSI becomes popular various software solutions to execute the iSCSI layer in software are emerging. Host system software typically executes the iSCSI layer in software. However, this process is slow and may consume host system processor time and resources, especially for generating digests and checking cyclic redundancy code (CRC).

Operating systems, for example, Microsoft Chimney support offloading of TCP/IP protocol stack from a host system to a network adapter, but do not solve digest and data copy problems for the iSCSI layer. For example, Microsoft defines a data receive algorithm for interoperation between a TCP/IP Offload Engine (TOE) Driver (described below) and the Microsoft Chimney Operating System to deliver a limited amount of data (up to a Maximum Segment Size) when data becomes available. The TOE Driver is blocked from delivering any more data to an Upper layer Protocol (ULP) until the ULP accepts or rejects the delivered data. The ULP may post additional data that may be received after the delivered data.

This process has significant latency between arrival of data and availability of a buffer (memory storage) to store data A TOE Module (described below) holds off delivery of data to the TOE Driver while the TOE Driver is waiting for the ULP to post a buffer. The ULP only posts a buffer large enough for the delivered data and the TOE Driver notifies the TOE Module to deliver the next data. In this case, the TOE Driver/TOE module interaction adds to the latency of data delivery to the ULP.

In another case when the TOE Module does not hold off delivery of data while the TOE Driver is waiting for a response from the ULP, the TOE Driver holds the received data in an anonymous buffer and then copies the data to the buffers posted by the ULP. This unnecessarily uses host system processor time and resources since data that is buffered by the TOE Driver has to be copied to ULP buffers consuming CPU cycles. The present adaptive aspects, described below tackle the latency issue.

RDMA: Remote Direct Memory Access (RDMA) is a standard upper layer protocol (incorporated herein by reference in its entirety) that assists one computer to directly place information in another computer's memory with minimal demands on memory bus bandwidth and CPU processing overhead. RDMA over TCP/IP defines interoperable protocols to support RDMA operations over standard TCP/IP networks.

Figure 1B:
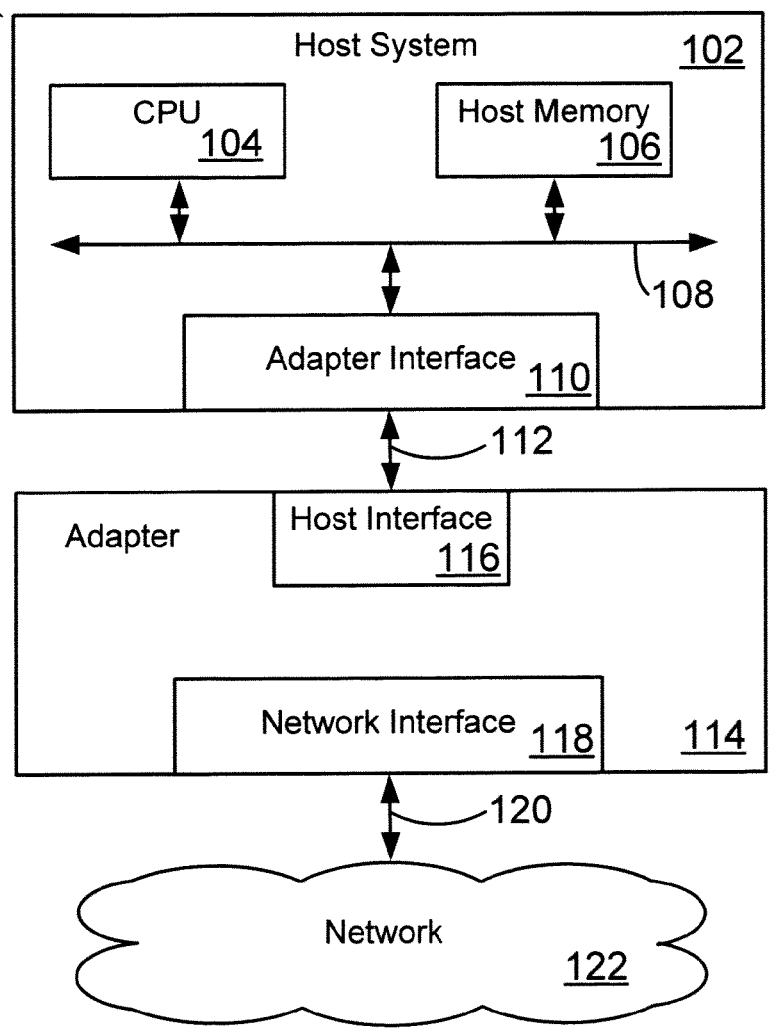
FIG. 1B shows a networking system, according to one embodiment.

FIG. 1B shows an example of networking system 100, used according to one embodiment. System 100 includes host system 102, which typically includes several functional components. These components may include central processing unit (CPU) 104, host memory (or main/system memory) 106, system bus 108, an input/output ("I/O") device (not shown), read only memory (not shown), and other components.

Host memory 106 is coupled to CPU 104 via system bus 108. Host memory 106 provides CPU 104 access to data and program information that is stored in host memory 106 at execution time. Typically, host memory 106 is composed of random access memory (RAM) circuits.

Host System 102 includes adapter interface 110, which couples host system 102 to network adapter 114 via bus/connection 112 and host interface 116. The structure of host interface 116 depends on bus/connection 112. For example, if bus 112 is a PCI bus, then host interface 116 includes logic and structure to support PCI bus based communication.

Adapter 114 connects host system 102 to network 122 via network interface 118 and network connection 120. The structure of network interface 118 depends on the type of network, for example, Ethernet, Fibre Channel and others.

Figure 1C:
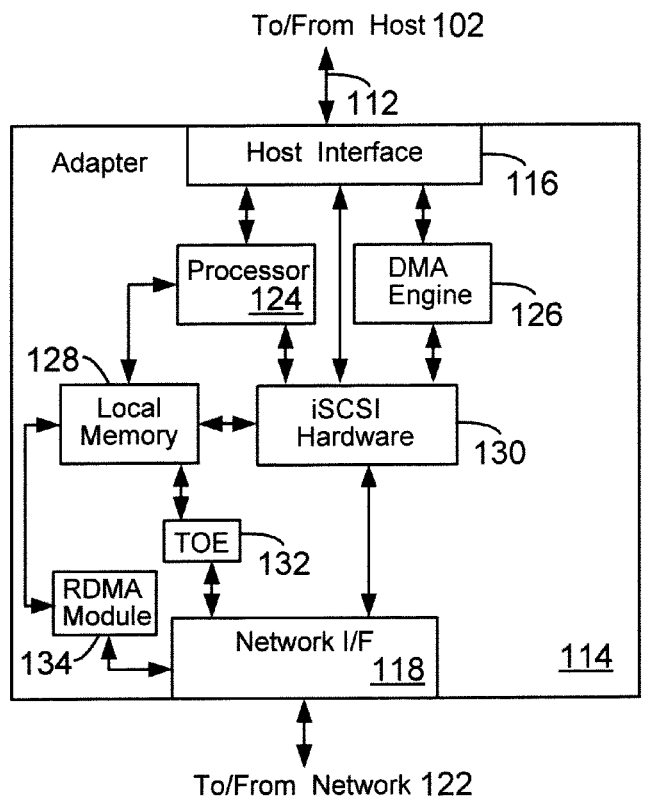
FIG. 1C shows a block diagram of an adapter having a TOE Module, according to an embodiment.

FIG. 1C shows a block diagram for adapter 114 interfacing with host system 102 via link (for example, a PCI bus) 112 and host interface 116. Adapter 114 may be on a PCI development board with a Field Programmable gate Array (FPGA). Adapter 114 may also be integrated into an Application Specific Integrated Circuit (ASIC).

Adapter 114 includes a TCP/IP accelerator module (also referred to as TCP Offload Engine (TOE) 132 that executes the TCP/IP protocol stack in the hardware, instead of a software stack at host system 102. Details of a TOE Module are provided in co-pending patent application Ser. No. 10/620,040, filed on Jul. 15, 2003, incorporated herein by reference in its entirety.

Adapter 114 includes processor 124 that has access to adapter memory 128. Processor 124 controls overall adapter 114 functionality by executing firmware instructions from memory 128.

Adapter 114 also includes a direct memory access ("DMA") engine 126, which performs direct memory access functions in sending data to and receiving data from host system 102.

Adapter 114 also includes iSCSI module 130 which includes a dedicated processor or state machine to accomplish this purpose. Instead of the software layer in host system 102, iSCSI module 130 performs various iSCSI layer operations in adapter 114, including processing digests, performing data copy offload and large PDU transmission offload operations. RDMA offload module 134 executes the RDMA protocol functionality in adapter 114.

Figure 1D:
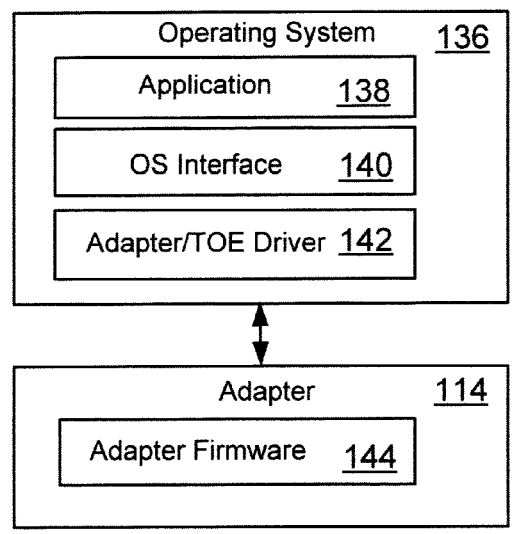
FIG. 1D shows a top-level block diagram of a software architecture, according to an embodiment.

FIG. 1D shows a block diagram of a top-level software architecture for implementing the various embodiments disclosed herein. CPU 104 executes operating system ("OS") 136 in host system 102. In one example, OS 136 may be based on Microsoft Chimney. Application layer (may also be referred to as ULP) 138 is executed in host system 102. Application 138 can send read and write requests via driver 142 (may also be referred to as TOE Driver 142). OS interface 140 interfaces between TOE Driver 142 and application 138. Adapter firmware 144 is executed by processor 124 out of memory 128 to control overall adapter 114 functionality.

Figure 1E:
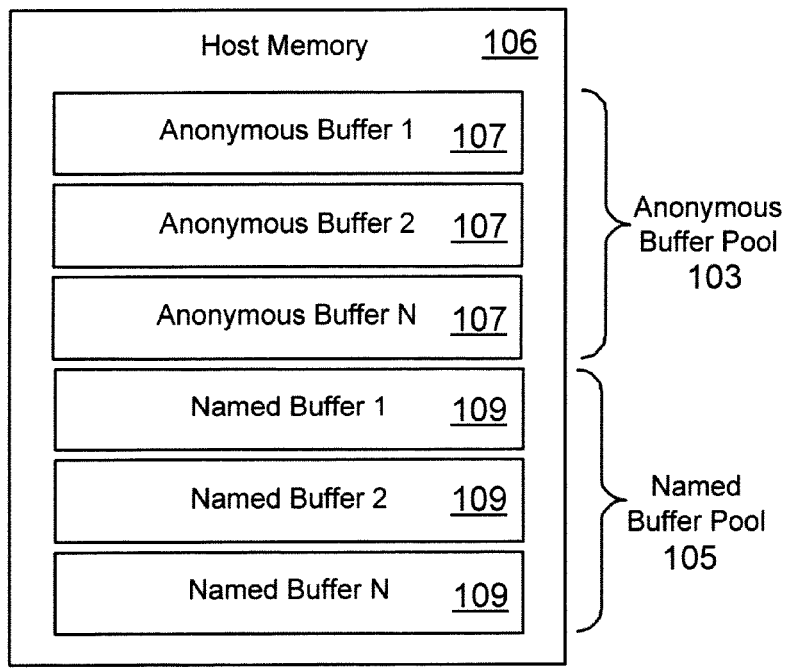
FIG. 1E shows a top-level block diagram of buffer pools created in a host memory, according to an embodiment.

FIG. 1E shows a top-level block diagram of buffer pools that are created by TOE Driver 142 in host memory 106 to facilitate efficient TOE operation. TOE Driver 142 creates Anonymous Buffer Pool 103 with anonymous buffers (or kernel buffers) 1-N 107 to temporally store incoming data from the network until application 138 is ready to accept data and move it to a named memory buffer 109 from amongst named memory buffer pool 105. Named buffers 109 are allocated to store information for a particular connection/application (for example, 138). Push Timers are used to make buffers available for a predetermined time only. Push Timers apply to Named buffers and are used to return Named Buffers 109 to an issuing application. Once a push timer has expired the associated buffer is released to anonymous buffer pool 103. The usage of buffer pools 103 and 105 are described below.

Before describing the details of buffer pools 103 and 105 operations the following defines certain terms that are used to explain the functionality of various embodiments described herein: "indicateWindowSize" is a parameter used by TOE Driver 142 and adapter 114 to specify a window size in bytes, representing the amount of data, which can be delivered by adapter 114 to TOE Driver 142, before adapter 114 suspends data transfer to wait for an application to pass a named buffer to adapter 114 or to acknowledge that data has been stored in anonymous buffer 107.

The value for "indicateWindowSize" may be set globally (i.e. for every interaction between TOE Driver 142 and adapter 114) or on a per network connection basis. TOE Driver 142 may import the "indicateWindowSize" value from a User Interface, a driver parameter file, flash read only memory, NVRAM, as a default value or from TOE Module 132. Generally, TOE Driver 142 passes the indicateWindowSize value to TOE Module 132 during initialization of adapter 114. TOE Driver 142 may also specify a unique value for indicateWindowSize for a connection when the connection is offloaded to TOE Module 132. The term "indicatewindowSize is open" means that data can be accepted from TOE module 132

Figure 1F:
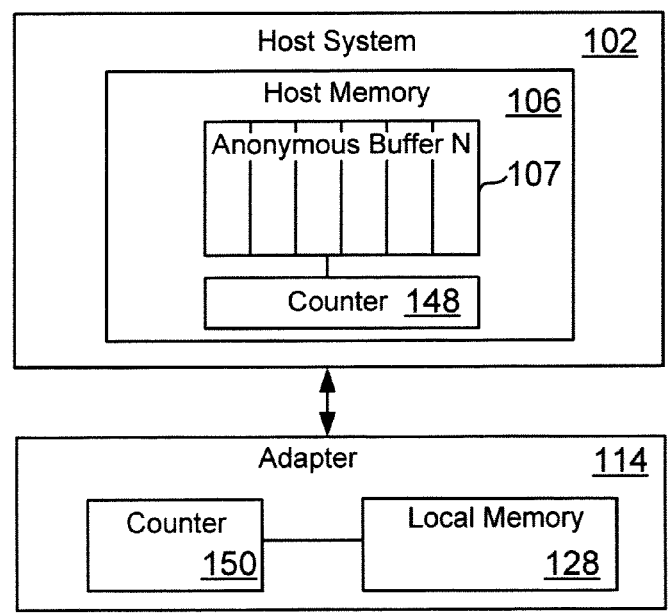
FIG. 1F shows a top-level block diagram of counters location, according to an embodiment.

An "indicatedBytes" parameter value indicates the number of bytes that have been received by TOE Driver 142 from adapter 114 (via TOE module 132) at any given time. As shown in FIG. 1F, the "indicatedBytes" parameter is based on the value of counter 148 that monitors the number of bytes received by TOE Driver 142 from adapter 114 and placed in host memory 106.

TOE Driver 142 resets "indicatedBytes" value to zero when "indicatedBytes" equals "indicateWindowSize" and received data has been copied to a named buffer or accepted by application 138. When the "indicatedBytes" value (i.e. counter 148) is reset to zero and there are no named buffers pending, TOE Driver 142 issues an "indicateAcknowledge" command to TOE Module 132 to open a new "indicateWindow" that allows TOE Module 132 to resume sending data to TOE Driver 142. TOE Driver 142 may optionally send an "indicateAcknowledge" command while data is being accepted to keep the indicate window open.

An "indicatedBytesPending" parameter is based on the value of counter 150 (FIG. 1F). Counter 150 is incremented by TOE Module 132 when a segment is sent to TOE Driver 142. The value of Counter 150 is incremented by the amount of data in the segment sent to TOE Driver 142. TOE Module 132 suspends sending data to TOE Driver 142 when counter 150 value is equal to "indicateWindowSize".

When TOE Module 132 receives an "indicateAcknowledge" command from TOE Driver 142, TOE Module 132 decrements counter 150 by a value specified in an "AcknowledgedBytes" field of the "indicateAcknowledge" command. When TOE Module 132 receives a Named Buffer from TOE Driver 142, TOE Module 132 resets counter 150 to the value 0.

Once TOE Module 132 has sent a number of bytes equal to or similar to a value specified by the "indicateWindowSize" to TOE Driver 142, TOE Module 132 stops sending data received from the network. TOE Module 132 holds pending data until TOE Driver 142 posts a buffer for application 138 for pending data or future received data, or acknowledges that some or all of data has been received. At that time, TOE Module 132 resumes sending pending data or future data to TOE Driver 142.

TOE Driver 142 receives network data sent by TOE Module 132 (in adapter 114). When TOE Driver 142 receives a buffer from application 138, TOE Driver 142 passes the buffer to TOE Module 132. In one example, the size of the buffer may be greater than the "indicateWindowSize". In this example, TOE Module 132 DMAs data outside of "indicateWindow" to the buffer passed by TOE Driver 142. TOE Driver 142 will first copy data in "indicateWindow" to the buffer. The buffers passed to TOE Module 132 are returned when the buffer is filled or a timeout expires.

If the buffer received from application 138 is smaller than the amount of data in "indicateWindow", then TOE Driver 142 copies the amount of data based on the "indicateWindow" size and returns the buffer to application 138. TOE Driver 142 then indicates to application 138 that more data is available.

If TOE Driver 142 does not receive a buffer from application 138 and application 138 signals that it has accepted the sent data, TOE Driver 142 then sends the next data based on the "indicateWindow" size to application 138.

As TOE Driver 142 moves data based on the "indicateWindow" size, it updates counter 148 (FIG. 1F). TOE Driver 142 may also inform TOE Module 132 that data has moved by issuing an "indicateAcknowledgement" command to TOE Module 132.

Figure 2:
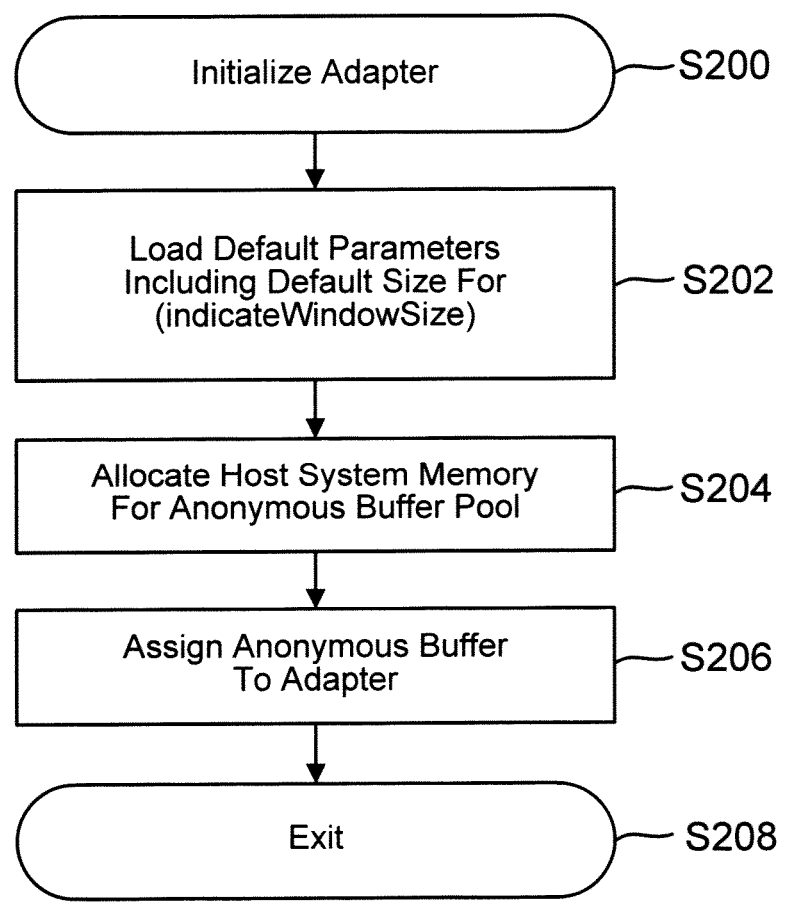
FIG. 2 shows a process flow diagram for initialization of a system for TOE operation.

FIG. 2 shows a process flow diagram for initializing system 100 for network operations. The process starts in step S200, when adapter 114 is initialized.

In step S202, TOE Driver 142 loads default operating parameters including a default value for "indicateWindowSize".

In step S204, TOE Driver 142 allocates host memory 106 for anonymous buffer pool 103 based on the default value for "indicateWindowSize".

In steps S206, TOE Driver 142 assigns certain anonymous buffers 107 to TOE Module 132.

In step S208, initialization of adapter 114 is complete and system 100 is ready for network communication, i.e. to receive and send network data.

Figure 3:
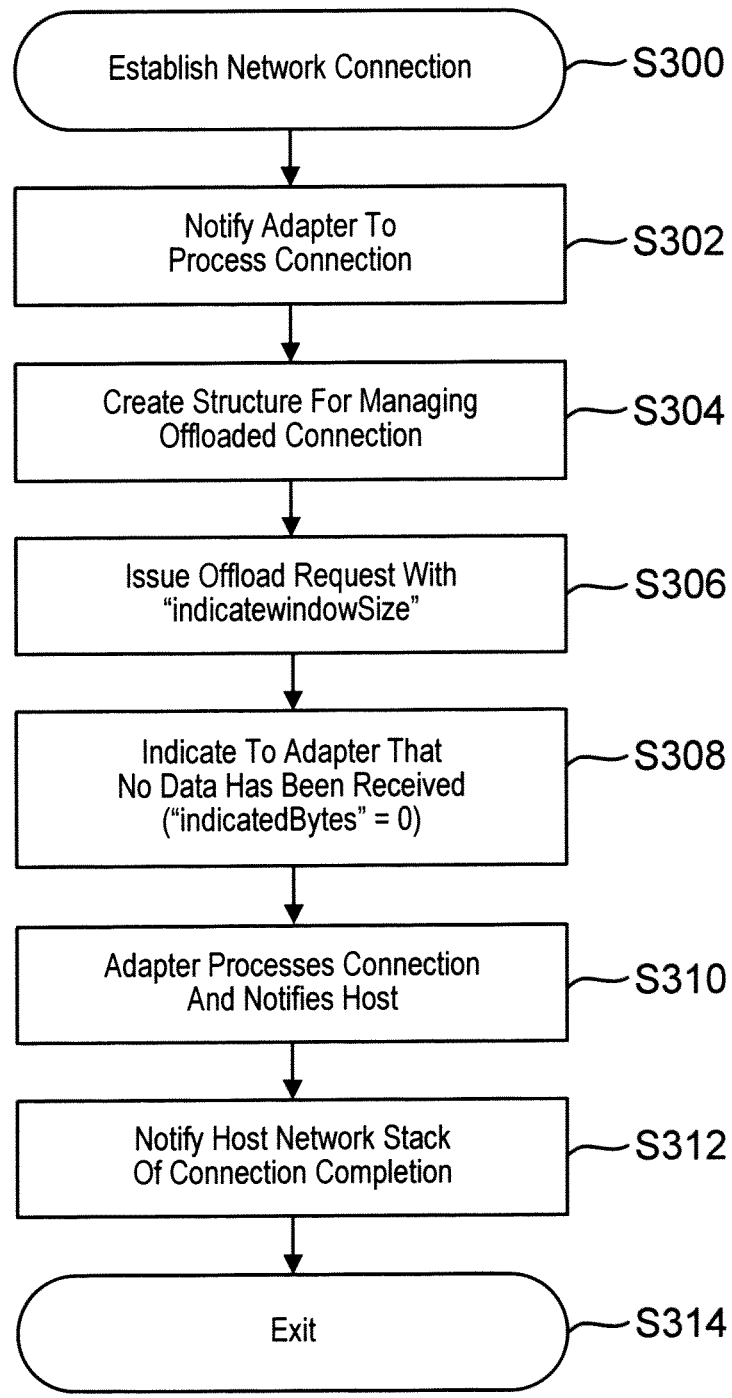
FIG. 3 shows a process flow diagram of establishing network connection for the TOE operation.

FIG. 3 illustrates a process for establishing and managing a network connection, according to one embodiment. The process starts in step S300 when host system 102 using adapter 114 establishes a network connection.

In step S302, host system 102 notifies Adapter 114 via TOE Driver 142 to process the connection (i.e. the connection is offloaded).

In step S304, TOE Driver 142 creates the appropriate structures for managing the offloaded connection.

In step S306, TOE Driver 142 passes the "indicatewindowsize" to adapter 114 in general and to TOE module 132 in particular.

In step S308, TOE Driver 142 also indicates to Adapter 114 that no data has been received i.e. the "indicatedBytes" value is zero (based on counter 148 value).

In step S310, TOE Module 132 processes the network connection and notifies TOE Driver 142 upon its completion.

In step S312, TOE Driver 142 notifies host system 102 network stack that the connection has been completed and in step S314, the process ends.

FIGS. 4A-4H show process flow diagrams for moving network data to a host system, according to one embodiment.

The process starts in step S400, when TOE Driver 142 receives the "IndicateData" parameter from adapter 114 for a connection.

In step S402, TOE Driver 142 queues (or assigns) Anonymous Buffers 107 for the connection. In one embodiment, every connection has a context and data is queued for every connection.

In step S404, TOE Driver 142 updates counter 148 by an amount of data that it has received from adapter 114 at any given time. It is assumed that adapter 114 has previously received data from the network prior to passing it to TOE Driver 142 in step S400.

In step S406, TOE Driver 142 determines if application 138 has completed a given task at any given instance; application 138 has been notified of data availability or if a named buffer from buffer pool 105 has been returned (i.e. cleared). If yes, then the process exits in step S408. Otherwise in step S410, TOE Driver 142 determines if a Named Buffer 109 is available from Application 138 for the connection. If a Named Buffer 109 is available, then in step S412 TOE Driver 142 copies data from Anonymous Buffer 107 to Named Buffer 109, otherwise the process moves to step S428, described below.

In step S414, TOE Driver 142 releases Anonymous Buffer 107 and in step S416, the released Anonymous Buffer 107 is returned to buffer pool 103 that is available for TOE Module 132.

In step S418, TOE Driver 142 determines if a Named Buffer 109 for application 138 is full. If yes, then in step S420, the Named Buffer 109 is returned to buffer pool 105. If Named Buffer 109 is not full the process moves to step S426, as described below.

In step S422, TOE Driver 142 checks if a Push Timer is running for the returned Named Buffer 109. If yes, then in step S424, TOE Driver 142 stops the Push Timer, otherwise the process continues to step S426.

In step S426, TOE Driver 142 determines whether all the received data has been copied to a named Buffer 109. If TOE Driver 142 determines that not all buffered data is copied to Named Buffer 109 (which means, that there is data but there are no Named Buffers 109 available), the process moves to step S428. If all the buffers are copied (which means, there are available buffers but there is no more data), the process moves to step S456, described below.

In step S428, TOE Driver 142 determines that Application 138 has been notified of data availability or Named Buffer 109 has been returned. If TOE Driver 142 determines that Application 138 has been notified, the process exits in step S440. If not, then in step S430, TOE Driver 142 notifies Application 138 of data availability.

In step S432, if application 138 provides a Return Code, then in step S436, TOE Driver 142 releases Anonymous Buffers 107, otherwise the process continues in step S434.

In step S434, if TOE Driver 142 determines that Named Buffer 109 is available, than the process moves to step S412, otherwise the process exits in step S440.

In step S438, TOE Driver 142 releases Anonymous Buffer 107 to pool 103 making it available for TOE Module 132.

In step S442, if TOE Driver 142 determines that there is more queued data, then in step S444, TOE Driver 142 checks if there is a Named Buffer 109 available for the queued data. If there is no queued data in step S442, then the process moves to step S446.

In step S444, if there is no Named Buffer 109 available then the process loops back to step S428. If a Named Buffer is available, then the process continues to step S412.

In step S446, TOE Driver 142 determines if "indicateWindow" is full i.e. the amount of data that can be received has been received. This is inferred when "indicatedBytes"="indicateWindowSize". If yes, then in step S448, TOE Driver 142 resets counter 148 by setting "indicatedBytes"=0, otherwise the process exits in step S454.

In step S450, TOE Driver 142 determines if a Named Buffer 109 has been posted (or allocated) for TOE Module 132, if yes, then in step S454, the process ends, otherwise in step S452, TOE Driver 142 issues an "indicateAcknowledge" parameter for TOE Module 132. The "indicateAcknowledge" parameter instructs TOE Module 132 to open a new "indicateWindow" which enables TOE Module 132 to resume sending data to TOE Driver 142.

In step S456, TOE Driver 142 determines whether "indicatedBytes"="indicateWindowSize". If yes, then in step 458, TOE Driver 142 resets counter 148 and the process ends in step S464, otherwise the process moves to step S460.

In step S460, TOE Driver 142 determines if a Named Buffer 109 is partially full. If not, then the process ends in step S464, otherwise, TOE Driver 142 determines if a Named Buffer 109 is in Push Mode. If a Named Buffer 109 is not in a Push Mode, the process ends in step S464.

The term "Push Mode" as used herein applied to Named Buffers. A Named Buffer is determined to be in a Push Mode when an Application sets a PUSH MODE flag in an application programming interface (API) that is used to pass the Named Buffer to the TOE Driver 142. When the Push Mode flag is set TOE Driver 142 and adapter 114 monitor received TCP segments that have been DMAed (using DMA engine 126) or copied to a Named buffer. If the TOE Driver 114 or adapter 114 detect that the TCP PUSH flag is set in a processed TCP Segment, TOE Driver 142 or adapter 114 return the Named Buffer within a PUSH Timer timeout period regardless of how much data has been placed into the Named Buffer. If the Push Mode flag is not set, then adapter 114 and TOE Driver 142 do not monitor the TCP Push flag in received TCP segments.

If the Named Buffer 109 is in a Push Mode, then in step S466, TOE Driver 142 determines if a push bit is set in a copied TCP segment. If the bit is set, then in step S470, the Named Buffer 109 is returned. If the push bit is not set, then in step S468, TOE Driver 142 determines if the push timer is running. If the Push Timer is not running, then the timer is started in step S476 and the process ends in step S478. If the push timer is running then the process ends in step S478.

If the push timer is running in step S472, then the timer is stopped in step S474 and the process ends in step S478. If the push timer is not running in step S472, then the process ends in step S478.

Figure 4A:
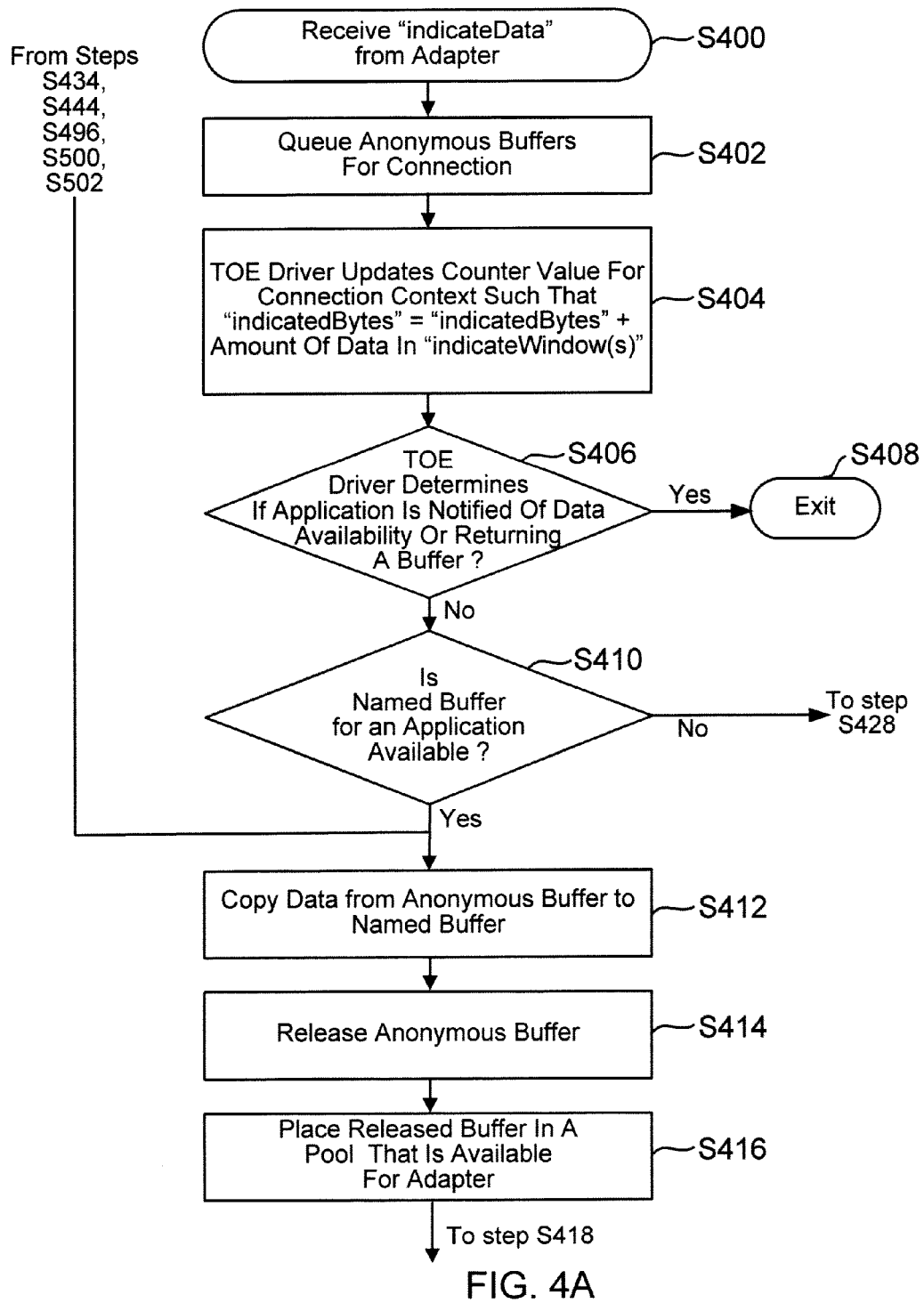
FIGS. 4A-4F show a process flow diagram of a TOE Driver's receive algorithm, according to an embodiment.
Figure 4B:
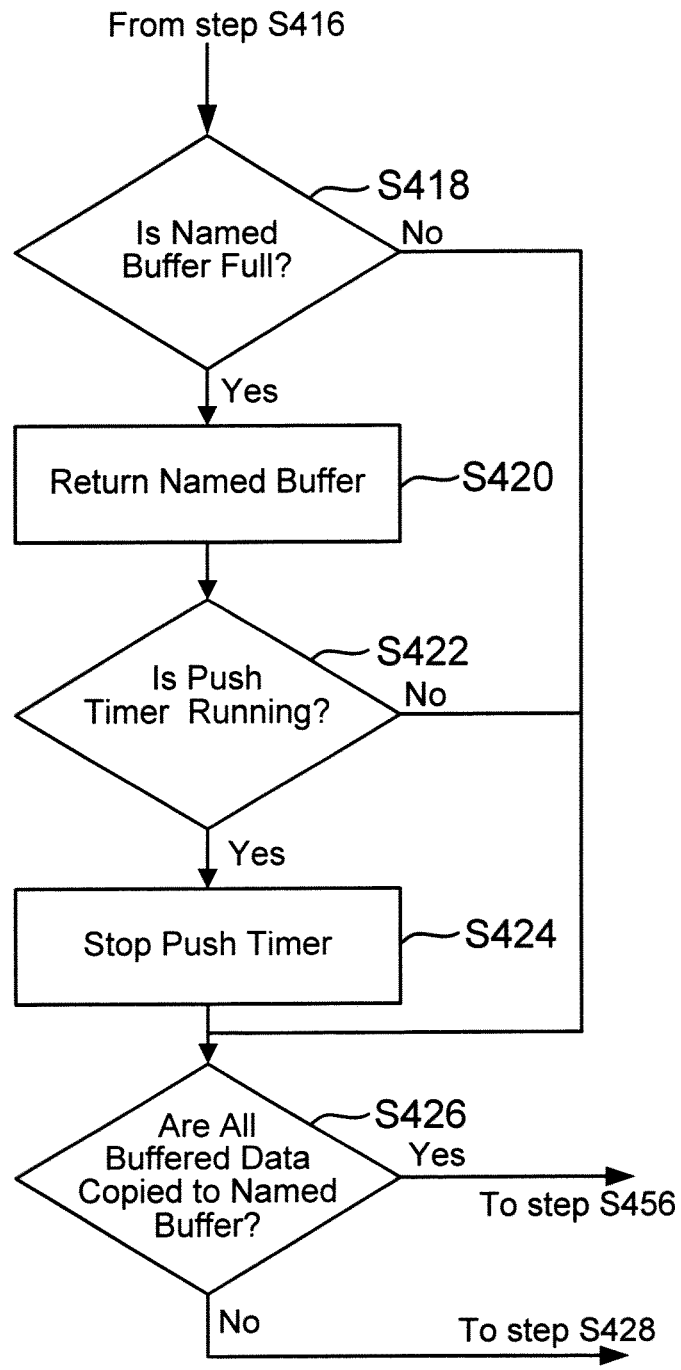
Figure 4C:
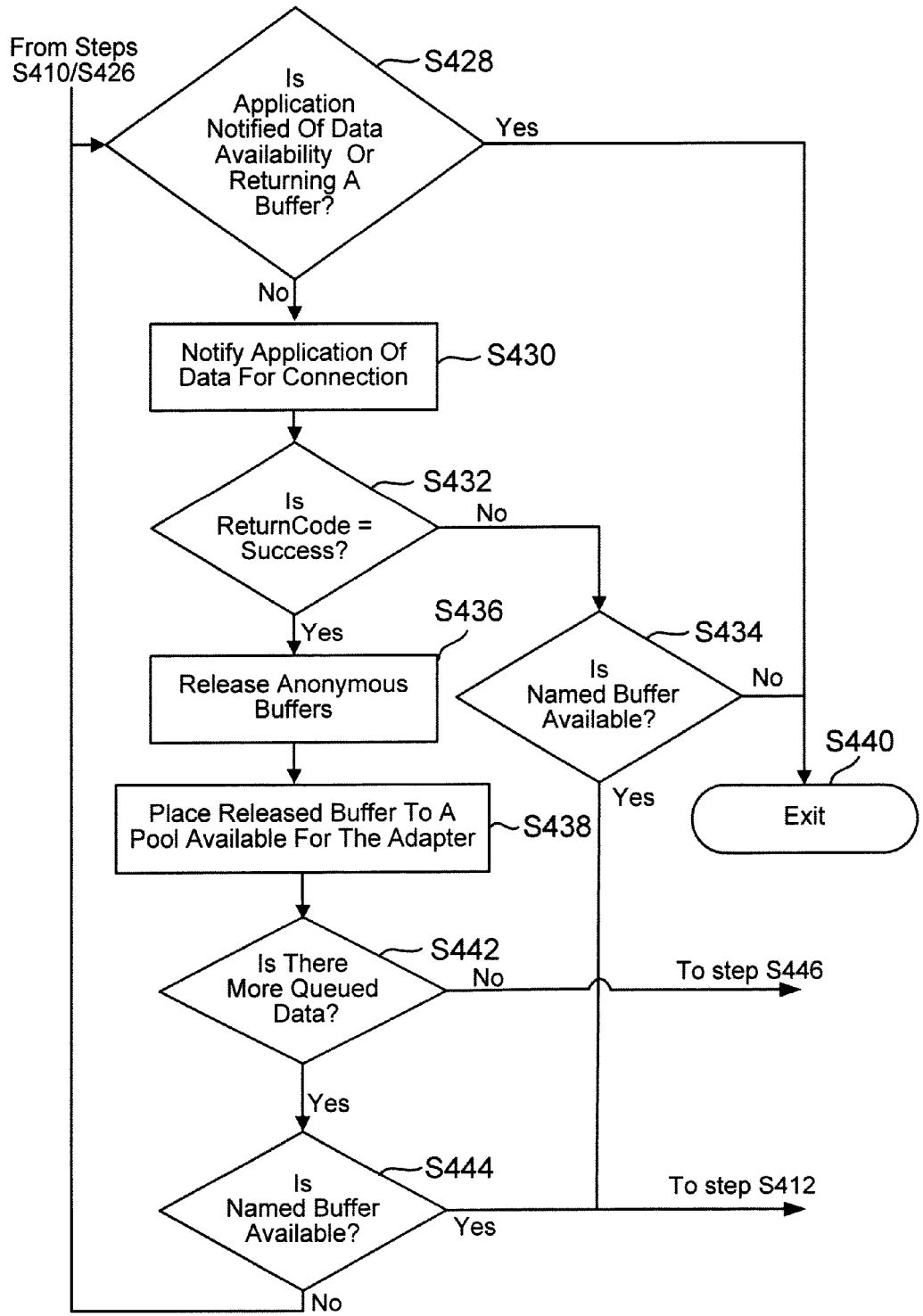
Figure 4D:
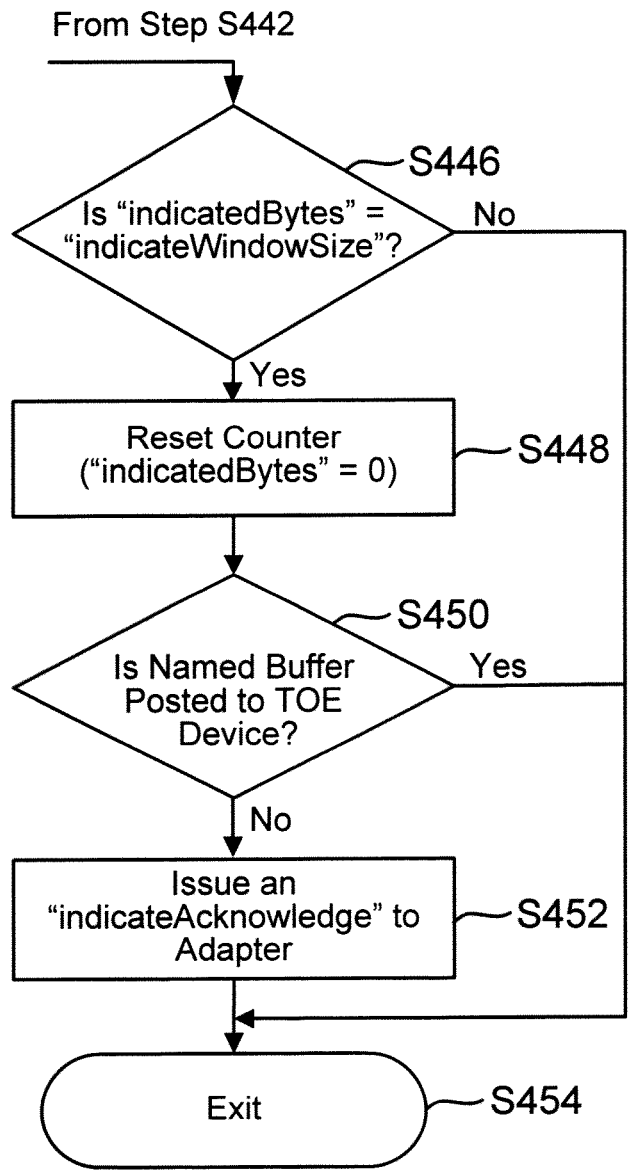
Figure 4E:
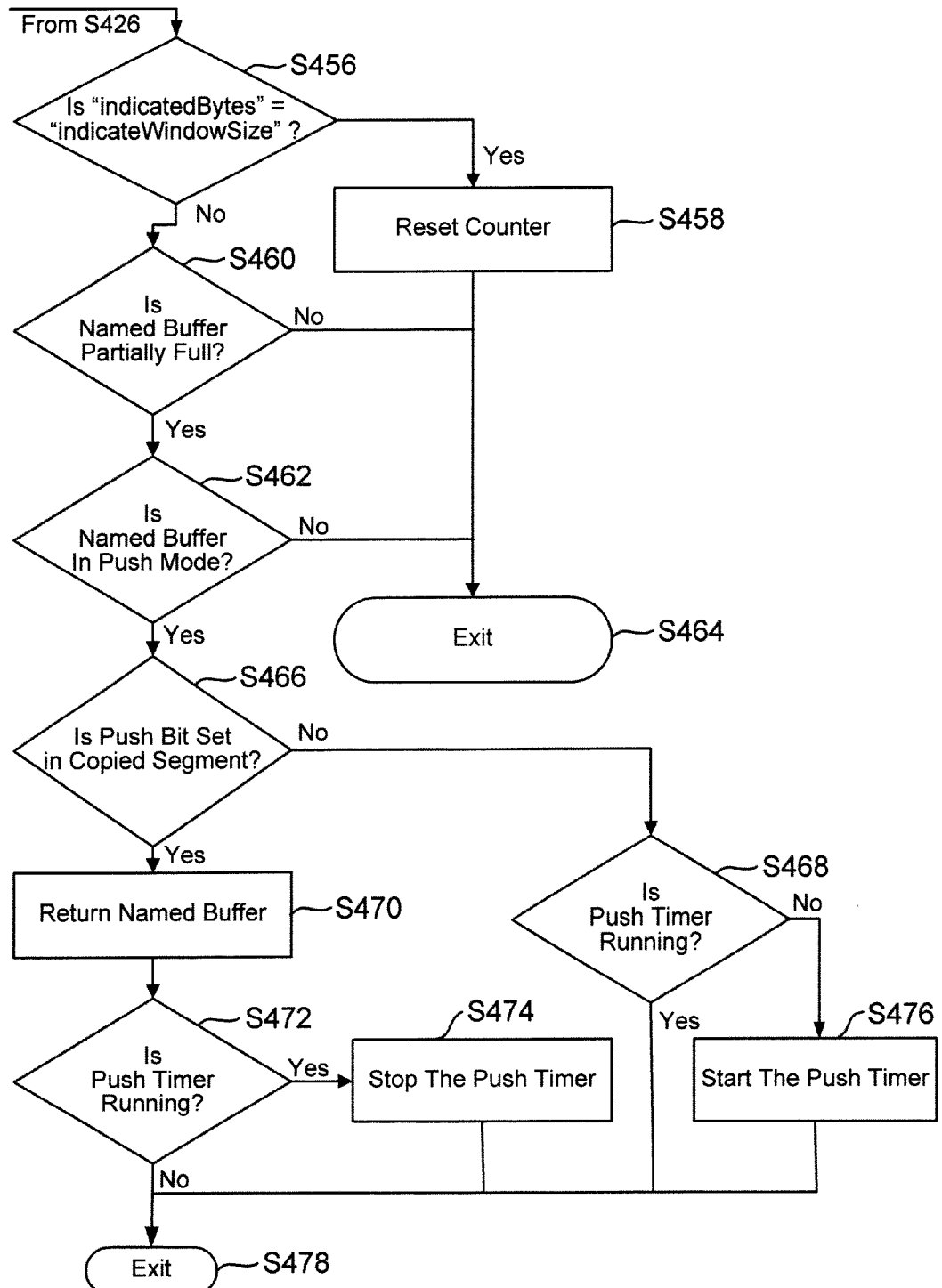
Figure 4F:
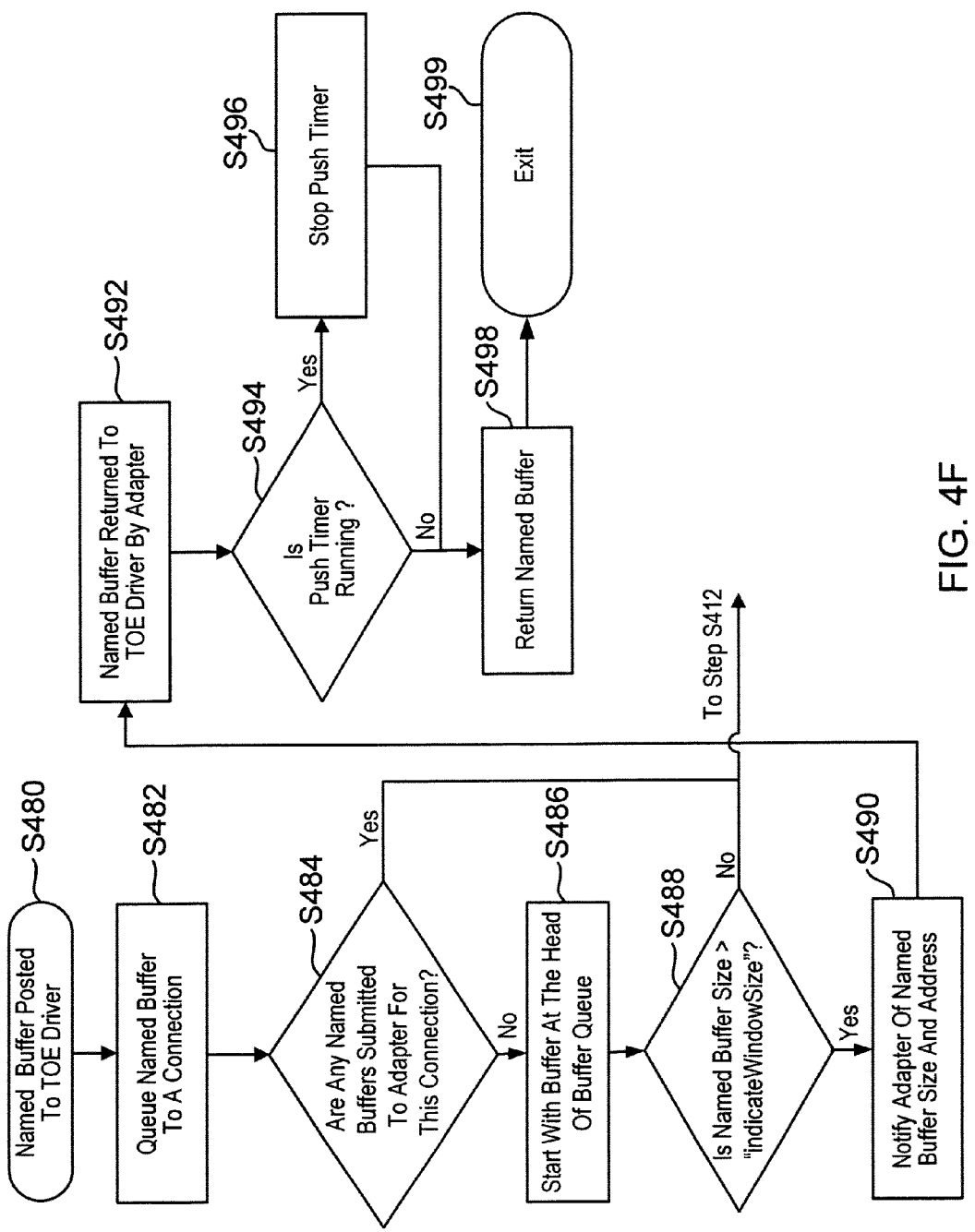

FIG. 4F shows a process flow diagram for handling Named Buffers, according to one embodiment. The process starts in step S480, when Application 138 posts (or allocates) a Named Buffer 109 for TOE Driver 142. The term allocates or posts as used throughout this specification means that Named Buffer 109 is assigned to store data for a connection.

In step S482, TOE Driver 142 queues a Named Buffer 109 for TOE Module 132 for a connection.

In step S484, if TOE Driver 142 determines if some Named Buffers have been submitted to TOE Module 132. If yes, then the process continues to step S412, otherwise TOE Driver 142 provides a Named Buffer 109 for TOE Module 132, starting from the head of a Named Buffer queue (or pool 103).

In step S488, if TOE Driver 142 determines that Named Buffer Size is not larger than "indicateWindowSize", then the process moves to step S412, otherwise TOE Driver 142 in step S490, notifies TOE Module 132 of Named Buffer 109's size and address where data can be placed.

In step S492, TOE Module 132 returns Named Buffer 109 to TOE Driver 142.

In step S494, if TOE Driver 142 determines if the push timer is running. If yes, then in step S496, TOE Driver 142 stops the push timer. Once the push timer expires or is stopped, in step S498, Named Buffer 109 is returned and the process ends in step S499.

The foregoing adaptive aspects reduce latency because the "indicateWindow" parameter allows data to be buffered while application 138 is determining whether to accept data or post a buffer. This reduces latency for data availability to a socket application. This results in better application performance. If the application is transaction based and operates primarily with small amounts of data the foregoing embodiments significantly increases performance of by reducing latency that is incurred on every transaction.

In another embodiment, the foregoing aspects also assist applications that operate primarily on large amounts of data by reducing latency and by providing simultaneous transfer of data by the TOE Driver (via data copy) and the TOE Device (via DMA engine 126).

Although the present invention has been described with reference to specific embodiments, these embodiments are illustrative only and not limiting. Many other applications and embodiments of the present invention will be apparent in light of this disclosure and the following claims.

What is claimed is:

1. A machine-implemented method for network communication, comprising:
   an application executed by a computing system allocating a named buffer for a driver executed by the computing system;
   the driver queuing a named buffer for a connection for an offload engine executed by an adapter that communicates with the computing system;
   the driver determining whether a named buffer has been submitted to the offload engine;
   if no named buffer has been submitted to the offload engine, the driver providing a named buffer for the offload engine, starting from a head of a named buffer pool;
   the driver determining whether a size of the named buffer is larger than a threshold size;
   if the size of the named buffer is larger than the threshold size, the driver notifying the offload engine of the named buffer's size and address where data can be placed;
   the offload engine returning the named buffer to the driver;
   the driver determining whether a push timer is running;
   if the push timer is running, the driver stopping the push timer;
   after stopping the push timer, or if the push timer is not running, the named buffer is returned to the named buffer queue.

2. The method of claim 1, wherein if the named buffer has been submitted to the offload engine, then the driver copies data from an anonymous buffer to the named buffer.

3. The method of claim 1, wherein if the size of the named buffer is not larger than the threshold size, then the driver copies data from an anonymous buffer to the named buffer.

4. The method of claim 1, wherein the driver is a TCP/IP offload (TOE) driver.

5. A system for network communication, comprising:
   a computing system executing an application for communicating with at least one networked device using a network connection; and
   a network adapter configured to interface with the computing system, receive network data from the at least one network device and send received network data to the application through a computing system driver executed by the computing system;
   wherein the application allocates a named buffer for the driver;
   wherein the driver queues a named buffer for a connection for an offload engine executed by the adapter;
   wherein the driver determines whether a named buffer has been submitted to the offload engine;
   wherein if no named buffer has been submitted to the offload engine, the driver provides a named buffer for the offload engine, starting from a head of a named buffer pool;
   wherein the driver determines whether a size of the named buffer is larger than a threshold size;
   wherein if the size of the named buffer is larger than the threshold size, the driver notifies the offload engine of the named buffer's size and address where data can be placed;
   wherein the offload engine returns the named buffer to the driver;

wherein the driver determines whether a push timer is running;

wherein if the push timer is running, the driver stops the push timer;

wherein after stopping the push timer, or if the push timer is not running, the named buffer is returned to the named buffer queue.

6. The method of claim 5, wherein if the named buffer has been submitted to the offload engine, then the driver copies data from an anonymous buffer to the named buffer.

7. The method of claim 5, wherein if the size of the named buffer is not larger than the threshold size, then the driver copies data from an anonymous buffer to the named buffer.

8. The method of claim 5, wherein the driver is a TCP/IP offload (TOE) driver.

* * * * *

UNITED STATES PATENT AND TRADEMARK OFFICE
CERTIFICATE OF CORRECTION

| | | |
|---|---|---|
| PATENT NO. | : 8,792,351 B1 | Page 1 of 1 |
| APPLICATION NO. | : 13/330085 | |
| DATED | : July 29, 2014 | |
| INVENTOR(S) | : Pearson et al. | |

It is certified that error appears in the above-identified patent and that said Letters Patent is hereby corrected as shown below:

In the Specification

Column 2, line 59, after "layer" insert -- 40 --.

Signed and Sealed this
Twenty-fifth Day of November, 2014

Michelle K. Lee
*Deputy Director of the United States Patent and Trademark Office*